(12) United States Patent
Byrd et al.

(10) Patent No.: US 10,075,435 B1
(45) Date of Patent: Sep. 11, 2018

(54) DEVICE DEREGISTRATION USING FORWARD-CHAINING ENCRYPTION

(71) Applicant: Amazon Technologies, Inc., Seattle, WA (US)

(72) Inventors: Nicholas Ray Byrd, Seattle, WA (US); Andrew Jay Roths, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 28 days.

(21) Appl. No.: 14/577,831

(22) Filed: Dec. 19, 2014

(51) Int. Cl.
  *H04L 29/06* (2006.01)
  *G06Q 10/06* (2012.01)

(52) U.S. Cl.
  CPC ......... *H04L 63/0853* (2013.01); *G06Q 10/06* (2013.01); *H04L 63/10* (2013.01)

(58) Field of Classification Search
  CPC . G06F 7/04; G06F 21/00; H04L 63/08; H04L 63/0846; H04L 63/083; H04L 63/0869; H04L 63/0428; H04L 9/3226; H04L 9/3213; H04L 63/0807; H04L 63/18; H04L 9/3247; H04L 63/062; H04L 63/0853; H04L 63/0876; G06Q 20/38; G06Q 20/32; G06Q 20/3821; G06Q 20/385; G06Q 20/3223; G06Q 20/027; H04W 4/16; H04W 12/06; H04W 52/02; H04W 52/0261; H04M 1/00; H04M 1/02; H04M 19/08; H04M 1/006; H04M 1/0202; H04M 3/54; H04M 3/42059; H04M 3/42263

USPC .......... 726/2–9; 713/155, 156, 172, 189; 455/417, 566; 705/37, 44
  See application file for complete search history.

(56) References Cited

U.S. PATENT DOCUMENTS

| | | | |
|---|---|---|---|
| 5,305,199 A | 4/1994 | LoBiondo et al. |
| 5,655,174 A | 3/1997 | Hirst |
| 6,023,593 A | 2/2000 | Tomidokoro |
| 6,204,763 B1 | 3/2001 | Sone |
| 6,529,692 B1 | 3/2003 | Haines et al. |
| 8,150,771 B1 | 4/2012 | Baram |
| 8,310,985 B2 | 11/2012 | Harb |
| 8,631,126 B2 | 1/2014 | Veiseh et al. |

(Continued)

OTHER PUBLICATIONS

Office Action for U.S. Appl. No. 14/469,336, dated Apr. 11, 2018, Rausch et al., "Effortless and Automated Reordering ", 19 pages.

*Primary Examiner* — Thanhnga B Truong
(74) *Attorney, Agent, or Firm* — Lee & Hayes, PLLC

(57) ABSTRACT

A fulfillment service may securely register and deregister third party electronic devices within a fulfillment environment. The fulfillment service may receive a service request from an electronic device. The fulfillment service may determine that the service request includes a deregistration token. Further, the fulfillment service may identify the electronic device associated with deregistration token. In response, the fulfillment service may delete fulfillment service information associated with the electronic device in response to determining the electronic device has been deregistered. In addition, the fulfillment service may send a service response to the electronic device instructing the electronic device to delete the deregistration token. In some cases, the service request may include a registration attempt. As such, the service response may include a security token for the electronic device.

20 Claims, 8 Drawing Sheets

(56) References Cited

U.S. PATENT DOCUMENTS

| | | | |
|---|---|---|---|
| 8,799,165 B2* | 8/2014 | Kirillin | G06Q 40/02 |
| | | | 705/50 |
| 8,924,262 B2 | 12/2014 | Shuster | |
| 8,966,599 B1* | 2/2015 | Barrows | H04L 63/08 |
| | | | 705/37 |
| 9,124,573 B2* | 9/2015 | Chastain | H04L 63/0807 |
| 9,141,779 B2* | 9/2015 | Shen | H04L 9/0866 |
| 9,210,133 B2* | 12/2015 | Yau | H04L 63/083 |
| 2001/0049846 A1 | 12/2001 | Guzzi et al. | |
| 2002/0116286 A1 | 8/2002 | Walker et al. | |
| 2002/0163662 A1 | 11/2002 | Kaufman et al. | |
| 2003/0105800 A1 | 6/2003 | Cullen | |
| 2012/0276891 A1* | 11/2012 | Bai | G08C 17/02 |
| | | | 455/420 |
| 2012/0284086 A1 | 11/2012 | McCaffrey | |
| 2013/0166332 A1 | 6/2013 | Hammad | |
| 2014/0344153 A1* | 11/2014 | Raj | G06Q 20/3821 |
| | | | 705/44 |
| 2015/0163766 A1 | 6/2015 | Weiss et al. | |

* cited by examiner

DEVICE DEREGISTRATION USING FORWARD-CHAINING ENCRYPTION

BACKGROUND

Managing the registration and deregistration of order/reorder devices within a fulfillment system may be challenging. Many service providers rely on manufacturer issued device identifiers for registration and deregistration. However, when managing third party order/reorder devices, a service provider may have no guarantee that the device identifiers are universally unique and/or valid. This may expose service providers to denial of services attacks whereby a malicious actor may block customers from registering legitimate devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
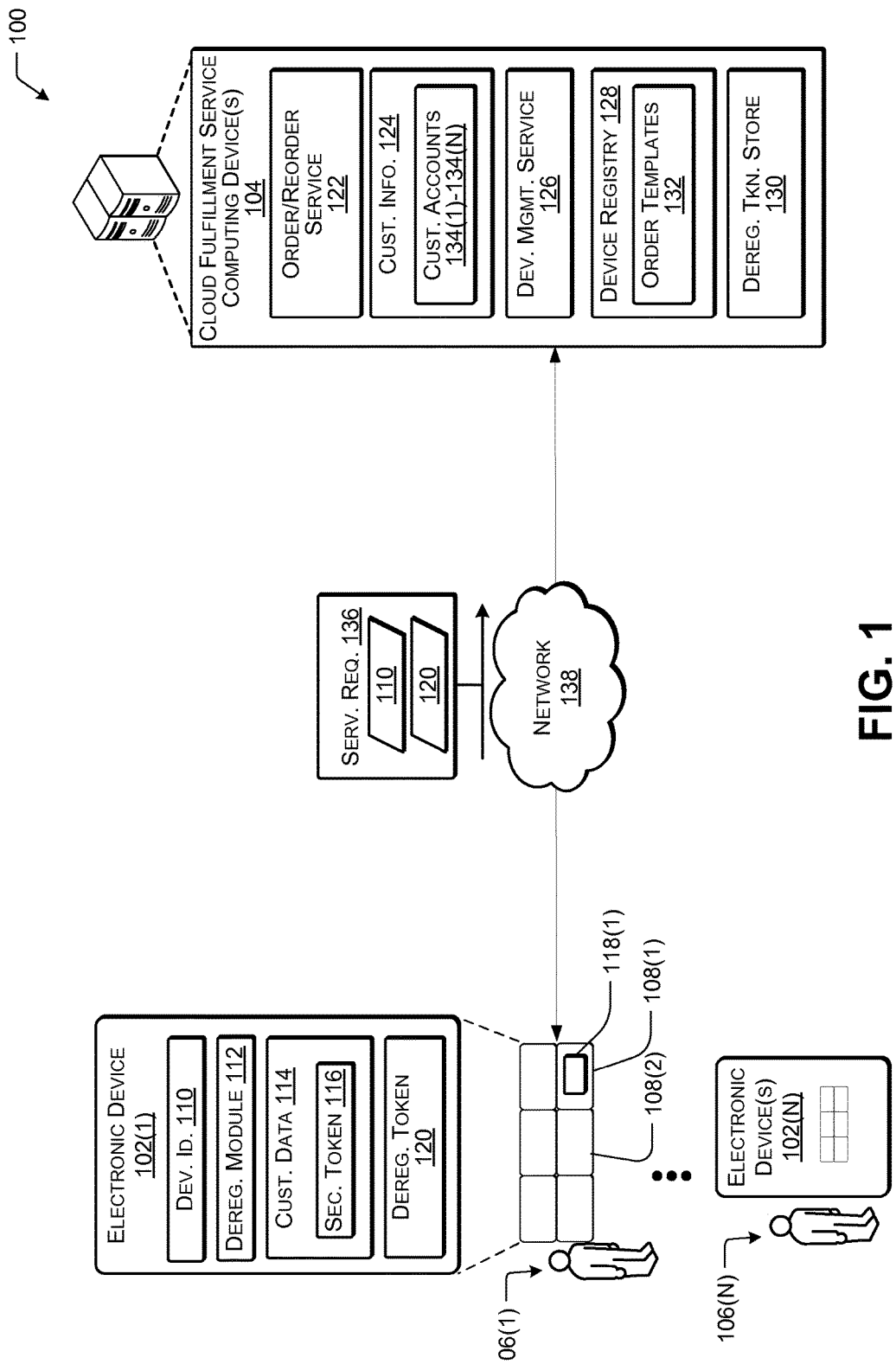
FIG. 1 illustrates an example framework for a fulfillment service that receives a service request that includes a deregistration token from an electronic device, according to some implementations.

This disclosure includes, in part, techniques and arrangements for deregistering a device within a cloud fulfillment environment (e.g., a retail fulfillment environment) in a secure manner. The present disclosure describes an electronic device that may be operated to allow a customer to order products from a fulfillment service. The electronic device may include a security token and customer data. In some embodiments, the customer may cause the electronic device to enter a setup mode and initiate a deregistration process. In some examples, the deregistration process may include performing a cryptographic function on the security token to generate a deregistration token, and deleting the security token and the customer data stored on the electronic device. Further, the electronic device may send a service request including the deregistration token to the fulfillment service. Upon receipt of the service request, the fulfillment service may determine that the service request includes the deregistration token, and may complete the deregistration process by deleting locally stored cloud data associated with the electronic device and/or customer.

In some embodiments, a fulfillment service companion application may be loaded and executed on a separate secondary device (e.g., a smart phone). Further, a customer may use the companion application to register an electronic device to order products for delivery by the fulfillment service. Once the registration is complete, the customer may order one or more products by simply pressing a control on the electronic device. Further, the customer may use the companion application to deregister an electronic device within the fulfillment environment. For instance, the companion application may send an instruction to the electronic device to enter a setup mode. Once the electronic device is in the setup mode, the electronic device may perform a deregistration process.

In various embodiments, customer input to the electronic device may cause an electronic device to enter a setup mode and perform a deregistration process. For instance, the electronic device may enter the setup mode based on a customer depressing one or more controls of the electronic device for a period of time greater than a specified threshold. In some other examples, the electronic device may enter the setup mode and perform a deregistration process based on location information and/or device activity information associated with electronic device.

The electronic device may be embedded and/or integrated into a separate host device (e.g., dishwasher, coffeemaker, refrigerator, etc). Further, the electronic device may enter the setup mode based on device activity information associated with host device. For instance, the electronic device may enter a setup mode and perform a deregistration process based on the electronic device detecting that the host device has not been plugged in for a period of time greater than a specified threshold. Additionally, the electronic device may enter a setup mode and perform the deregistration process based on location information associated with host device. For instance, the electronic device may perform the registration based on detecting the removal of a fastening device associated with the host device.

In some embodiments, a fulfillment service may manage the registration of electronic devices within the delivery system. The fulfillment service may receive a registration token request from a companion application. Further, the fulfillment service may extract customer credentials from the registration token request, and authenticate the customer credentials. If authentication is successful, the fulfillment service may send a registration token to the companion application.

Additionally, or alternatively, the fulfillment service may receive a registration token request from an electronic device. Further, the fulfillment service may extract customer credentials from the registration token request, and authenticate the customer credentials. If authentication is successful, the fulfillment service may send a registration token to the electronic device.

Further, the fulfillment service may receive a registration request from an electronic device that includes a registration token and a device identifier. In response, the fulfillment service may associate a customer with the electronic device based on the registration token. For example, the fulfillment service may map a control of the electronic device with an account of the customer within the fulfillment environment. In addition, the fulfillment service may send a security token to the electronic device. In some cases, the security token may be used as an authentication credential to identify the electronic device within the fulfillment environment.

In various embodiments, a fulfillment service may manage deregistration of electronic devices within the delivery system. For instance, the fulfillment service may receive a deregistration request from an electronic device. In response to receipt of the deregistration request, the fulfillment service may disassociate a customer from the electronic device. For example, the fulfillment service may delete any mappings between one or more controls of the electronic device and an account of the customer within the fulfillment environment. As used herein, the term "delete" may include erasure, removal, overwriting and/or clearing of data from a storage medium.

In some other instances, the fulfillment service may receive a service request from an electronic device. Further, the service request may include a token. In some examples, the fulfillment service may determine that the token is a deregistration token. In response, the fulfillment service may disassociate a customer from the electronic device. For example, the fulfillment service may delete any mappings between one or more controls of the electronic device and an account of the customer within the fulfillment environment. In some examples, the service request may include a registration request. As a result, the fulfillment service may respond to the service request with a new security token. Further, the response may instruct the electronic device to delete the deregistration token.

FIG. 1 illustrates an example framework 100 for a fulfillment service that receives a service request from an electronic device, according to some implementations. FIG. 1 shows illustrative interactions within a fulfillment environment between one or more electronic devices 102 and a remote system of a fulfillment service 104 when performing various operations, including deregistering the electronic device 102 within the fulfillment environment. Each electronic device 102 may be associated with a respective customer 106. For example, one or more first electronic devices 102 may be associated with a first customer 106. Further, other electronic devices 102(N) may be associated with other customers 106(N).

The electronic device 102(1) may be operable to allow the customer 106(1) to order products (e.g., toiletries) for home delivery. The electronic device 102(1) may include one or more controls 108, such as control 108-1, control 108-2, ..., associated with products that the fulfillment service 104 may deliver to the customer 106(1), a device identifier 110, a deregistration module 112, customer data 114, and a security token 116. Only some of the controls are shown with the reference number 108 for ease of illustration. In some examples, the electronic device 102 may not include the device identifier 110. In some other examples, the electronic device may encrypt the device identifier 110 and store it in an encrypted form.

In some embodiments, the one or more controls may be individually marked with labels 118, such as label 118-1, ..., that indicate to the customer 106 a product associated with the control 108-1 of the electronic device 102(1). In some cases, the label may be any textual or graphical indicia that can be displayed on a monitor of a computer, hand-held device, or printed paper. The label 118-1 may be affixed to an associated control 108-1, such as through an adhesive. Alternatively, the label 118-1 may be laser-etched onto the electronic device 102 for durability. Only some of the labels are shown with the reference number for ease of illustration. There may be one label 118 for each corresponding control 108, or fewer labels 118 than controls 108. In other implementations, the controls 108 may be differentiated from one another in other ways, such as through color coding, shape, or texture.

The device identifier 110 may be an identifier individually assigned to that electronic device 102(1). Typically, but not necessarily, each electronic device 102 stores its respective device identifier 110 in a memory component of the electronic device 102. Such device identifiers may be assigned during manufacturing of the electronic device 102, or the electronic device 102 may be assigned the device identifier post manufacturing during a configuration process. In some examples, the device manufacturer may be a third party manufacturer and the electronic device 102 may be a third party electronic device 102. Accordingly, the fulfillment service 104 may not control the creation and assignment of the device identifiers. As such, the fulfillment service 104 may not be capable of ensuring the uniqueness of the device identifier 110 associated with electronic device 102 within the fulfillment environment. In some other examples, the fulfillment service 104 may generate and/or assign the device identifier 110 to the electronic devices 102(1). Further, the fulfillment service 104 may encrypt the device identifier 110 before providing the device identifier 110 to the electronic device 102(1).

In the illustrative example of FIG. 1, suppose the customer 106(1) intends to sell the electronic device 102(1). The customer 106(1) will want to deregister the electronic device 102(1) within the fulfillment environment. Otherwise, the next owner of the electronic device 102(1) may use the electronic device 102(1) to submit unauthorized order requests to the fulfillment service 104 that may be billed to an account associated with the customer 106(1). In order to initiate a deregistration process, the customer 106(1) may cause the electronic device 102(1) to enter a setup mode. Once the electronic device 102(1) enters a setup mode, the deregistration module 112 may determine that the electronic device 102(1) has been previously registered with the fulfillment service 104. For instance, the deregistration module 112 may determine that the customer data 114 contains the security token 116. As a result, the deregistration module 112 may initiate the deregistration process. In some examples, the deregistration process may include performing a cryptographic function on the security token 116 to generate a deregistration token 120. Example cryptographic functions may include cryptographic hash functions (e.g., message digest algorithm ("MD5"), secure hash algorithm-1 ("SHA-1"), secure hash algorithm-2 ("SHA-2"), secure hash algorithm-3 ("SHA-3"), etc.), one-way functions, public private key encryption functions, symmetric key encryption, etc. For example, the deregistration module 112 may generate a keyed-hash message authentication code ("HMAC") based on the security token and a salt value (e.g., nonce). As another example, the deregistration module 112 may encrypt the security token 116 with the public key of the fulfillment service 104. Further, the deregistration process may include deleting the customer data 114 stored on the electronic device 102. In some examples, the customer data 114 may include customer order information (e.g., order history, customer account information, etc.) in addition to the security token 116. Further, the deregistration process may include sending the fulfillment service 104 a request to deregister the electronic device 102(1) within the fulfillment environment.

The fulfillment service 104 may include an order/reorder service 122, customer information 124, a device management service 126, a device registry 128, and a deregulation token store 130. The order/reorder service 122 may receive order requests from the electronic devices 102. In some examples, the electronic device 102 sends order requests in response to a customer 106 pressing one of the controls 108 of the electronic device 102. Upon receipt of an order request, the order/reorder service 122 may retrieve an order template 132 associated with the control 108 of the electronic device 102 from the device registry 128. In some examples, the order template 132 may include a mapping between the electronic device 102, one or more product identifiers, and an identifier of a customer account 134. In addition, the order template 132 may include additional purchase information, such as an order quantity, product size, applicable discounts, applicable coupons, and so on. Further, each order template 132 may be associated with a control 108 of an electronic device 102. In some examples, the fulfillment service 104 may generate elements of the order template 132 after the manufacturing of the electronic device 104. In some other examples, the device management service 126 may generate elements of the order template 132 during the registration of the electronic device 102.

Once the order/reorder service 122 retrieves the order template 132, the order/reorder service 122 may initiate the shipment of one or more products associated with the one or more product identifiers to the customer 106 associated with the order template. Further, the order/reorder service 122 may determine a customer account 134 associated with the customer 106 within the customer information 124 based at least in part on an identifier of the customer account 134 included in the order template 132. Each customer 106 may be associated with a respective customer account 134. For example, the first customer 106(1) may be associated with a first customer account 134(1). Further, other customers 106(N) may be associated with other customer accounts 134(N). The customer accounts 134 may include customer account identifiers, customer profiles, login information (e.g., customer names and passwords) to the fulfillment service 104, full names, email addresses, shipping addresses, billing addresses, credit card accounts, bank accounts, rewards accounts, electronic devices registered to the customer account, and customer purchase history. In addition, the order/reorder service 122 may bill the customer accounts 134 for the purchase of the one or more products associated with the one or more product identifiers.

In some instances, the electronic device 102(1) may not have access to the fulfillment service 104. As a result, the electronic device 102(1) cannot send the fulfillment service 104 a request to deregister the electronic device 102(1) within the fulfillment environment. Alternatively, the fulfillment service 104 may receive the request to deregister electronic device 102(1) and fail to deregister the electronic device 102(1). As such, the fulfillment service 104 may still associate the electronic device 102(1) with the customer 106(1). For instance, the device registry 128 may include an order template that associates the customer 106(1) with the electronic device 102(1).

Once the electronic device 102(1) generates the deregistration token 120, any order request or registration request sent by the electronic device 102(1) may include the deregistration token 120. For example, when the control 108(1) of the electronic device 102(1) is pressed, the electronic device 102 may send a service request 136 that includes the device identifier 110 and deregistration token 120 to the fulfillment service 104 via a network 138. In some cases, the network 138 may be a publicly accessible network of linked networks, possibly operated by various distinct parties, such as the Internet. In other embodiments, the network 138 may include a private network, personal area network ("PAN"), local area network ("LAN"), wide area network ("WAN"), cable network, satellite network, etc. or some combination thereof, each with access to and/or from the Internet. For example, one or more computing devices associated with the fulfillment service 104 may be located within a single data center and may communicate via a private network.

In the illustrative example of FIG. 1, the fulfillment service 104 may receive the service request 136 containing the device identifier 110 and the deregistration token 120 from the network 138. Upon receipt of the service request 136, the device management service 126 of the fulfillment service 104 may determine that the service request 136 contains a deregistration token 120. For example, the device management service 126 may match the deregistration token 120 with a deregistration token stored locally in the deregistration token store 130. In response, the fulfillment service 104 may deregister the electronic device 102(1) within the fulfillment environment. For instance, the fulfillment service 104 may delete one or more of the order templates 132 associated with the electronic device 102(1) from the device registry 128. In some examples, the fulfillment service 104 may delete all of the order templates 132 associated with the electronic device 102(1) and the customer 106(1). Further, the device management service 126 may update the customer account 134(1) associated with the customer 106(1) to indicate that the electronic device 102(1) is no longer registered to the customer 106(1).

Figure 2:
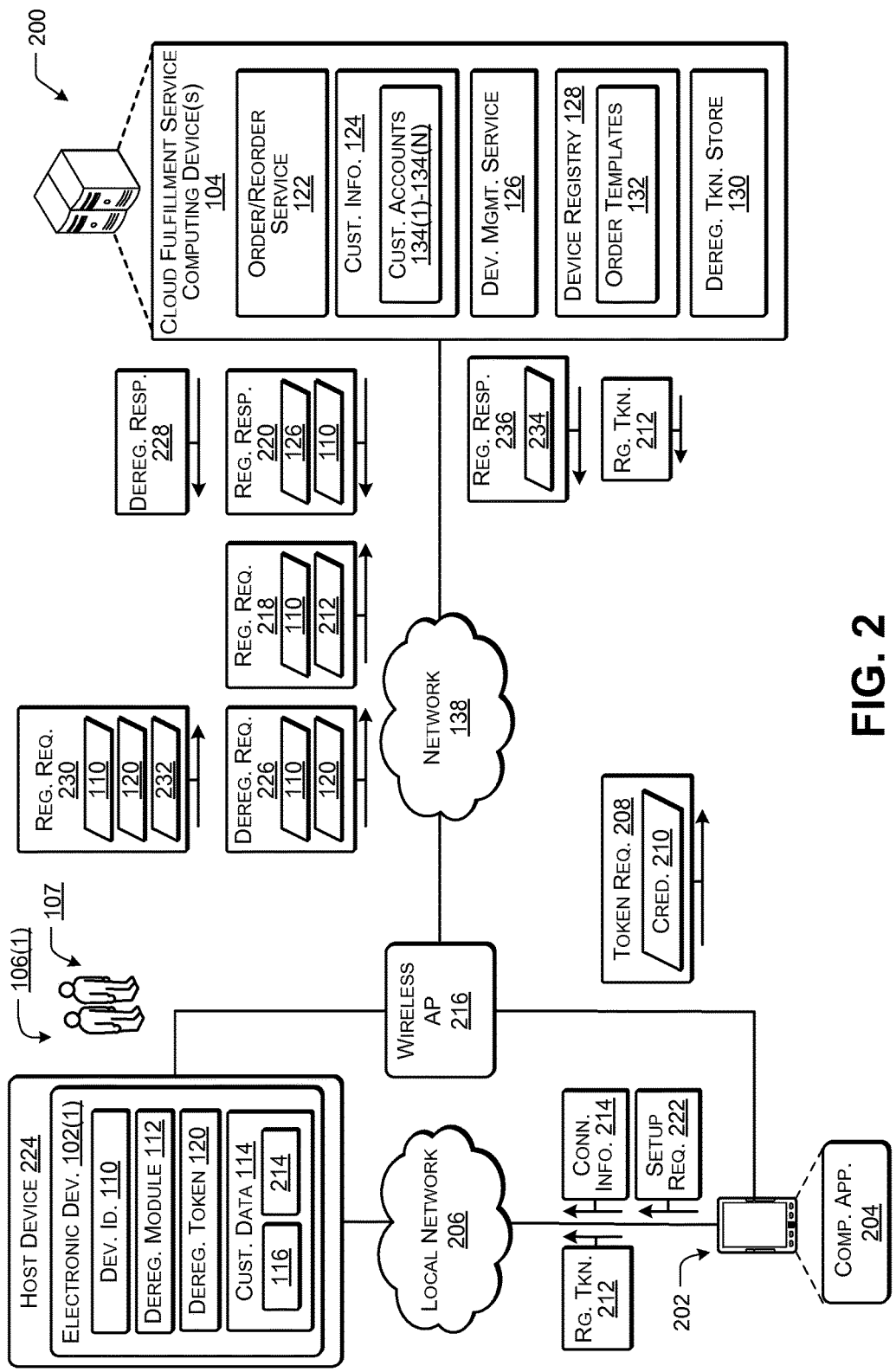
FIG. 2 illustrates an example framework for registering and deregistering an electronic device with a fulfillment service, according to some implementations.

FIG. 2 illustrates an example framework 200 for managing an electronic device, according to some implementations. FIG. 2 shows illustrative interactions between the electronic device 102, a management device 202, and the fulfillment service 104 when performing various operations, including registering and deregistering the electronic device 102 within the fulfillment environment. As discussed additionally below, some examples of the management device 202 may include smart phones and mobile devices; desktop, terminal and workstation computing devices; laptop and netbook computing devices; digital media devices and eBook readers; tablet computing devices; televisions; gaming systems; home electronic devices; automotive electronic devices; and any other device capable of collecting information and communicating the information to the fulfillment service 104.

In some examples, the management device 202 may include a fulfillment service companion application 204 (e.g., a smartphone application) programmed to communicate registration information between the electronic device 102 and the management device 204 via a local network 206, and between the management device 202 and the fulfillment service 104 via the network 138. Additionally, or alternatively, the management device 202 may access a website (e.g., a fulfillment service website) that offers functionality similar to the companion application 204 via a web browser application.

The local network 206 may include both wired and wireless networks, such as cellular networks, radio, Wi-Fi networks, short-range or near-field networks (e.g., Bluetooth®), infrared signals, local area networks, wide area networks, private network, personal area network ("PAN") (e.g., IEEE 802.15.4/ZigBee®, Z-Wave®, etc), cable network, satellite network, the Internet, and so forth. Further, the management device 202 and the electronic device 102 may communicate and interact with one another using any combination of suitable communication and networking protocols.

In the illustrative example of FIG. 2, the companion application 204 may send a registration token request 208 to the fulfillment service 104. The registration token request may include credentials 210 associated with customer 106 (1). For example, the credentials 210 may include a username and password associated with the customer 106. Further, the device management service 126 may authenticate the customer 106(1) based on the credentials 210. If the customer 106(1) successfully authenticates to the device management service 126, the device service management 126 may send a registration token 212 to the companion application 204. Further, the management device 202 may provide audio and/or visual feedback to the customer 106(1) to indicate successful receipt of the registration token 212.

Further, the companion application 204 may send the registration token 212 and connection information 214 to the electronic device 102(1) via the local network 206. The connection information 214 may be used by the electronic device 102 to establish a wireless connection with a Wireless Access Point (WAP) 216. For example, the connection information 214 may include a service set identifier (SSID) and an (optional) password associated with the WAP 216. In addition, the electronic device 102(1) may store the connection information 214 in the customer data 114.

In some other examples, the electronic device 102 may send the registration token request 208 to the fulfillment service 104. For instance, customer 106(1) input may trigger the sending of the registration token request 208 to the fulfillment service 104. For example, the registration token request 208 may be sent to the fulfillment service 104 based on the customer 106(1) pressing the control 108-1 of the electronic device 102 for a predetermined period of time (e.g., 5 seconds).

In the illustrative example of FIG. 2, the electronic device 102 may send a registration request 218 to the fulfillment service 104 including the registration token 212 and the device identifier 110. In some examples, customer 106(1) input may trigger the sending of the registration request 218 to the fulfillment service 104. For instance, the registration request 218 may be sent to the fulfillment service 104 based on the customer 106(1) pressing the control 108-1 of the electronic device 102 for a specified period of time (e.g., 5 seconds). In some other examples, the registration request 218 may include only the registration token 212.

Upon receipt of the registration request 218, the fulfillment service 104 may register the electronic device 102 to the customer account 134(1) based on the registration token 212. For example, the device management service 126 may generate the security token 126, which uniquely identifies the electronic device 102 within the fulfillment environment. In addition, the device management service 126 may generate one or more order templates 132 in the device registry 128. Further, the order templates 132 may include a mapping between the security token 126 and the customer account 134(1) associated with the registration token 212.

In addition, the device management service 126 may update the customer account 134(1) to indicate that the electronic device 102 is registered to the customer 106(1). For instance, the device management service 126 may update a customer profile associated with the customer account 134(1) to include information indicating that the device identifier 110 and/or the security token 116 represent the electronic device 102(1) registered to the customer account 134(1).

Further, the device management service 126 may generate the deregistration token 120 associated with the electronic device 104 by performing a one-way function on the security token 120. In addition, the device management service 126 may store the deregistration token 120 in the deregistration token store 130.

In addition, the device management service 126 may send a registration response 220 to the electronic device 102. In some examples, the registration response 220 may include the security token 116 and the device identifier 110 of the electronic device 102. Further, the electronic device 102 may provide audio and/or visual feedback to the customer 106(1) to indicate successful receipt of the registration response 220. In some other examples, the registration response 220 may include only the security token 126.

Once the electronic device 102 is registered, the customer 106(1) may use the electronic device 102 to order products from the fulfillment service 104. For example, the customer 106(1) may press the control 108(1) to order an item associated with the control 108(1) from the fulfillment service 104. Further, the order/reorder service 122 may determine the item to order based in part on one or more order templates 132 associated with the control 108(1). However, in some instances, the customer 106(1) may decide to discard the electronic device 102. For example, the customer 106(1) may decide to sell or loan the electronic device 102 to another customer 106. In some other examples, the customer 106(1) may dispose of the electronic device 102 or provide the electronic device 102 to another human being for servicing. As a result, the customer 106(1) may decide to deregister the electronic device 102 with the fulfillment service 104.

In the illustrative example of FIG. 2, the companion application 204 may send a setup mode request 222 to the electronic device 102(1). In response, the electronic device 102(1) may enter a setup mode. Once the electronic device 102(1) enters the setup mode, the deregistration module 112 may determine that the electronic device 102(1) has been previously registered with the fulfillment service 104. For instance, the deregistration module 112 may determine that the customer data 114 contains the security token 116. As a result, the deregistration module 112 may initiate the deregistration process. In some other examples, the electronic device 102(1) may enter the setup mode based on the customer 106(1) pressing one or more of the controls 110 of the electronic device 102 for a specified period of time (e.g., 5 seconds). Further, the electronic device 102 may provide audio and/or visual feedback to the customer 106(1) to indicate that the electronic device 102 has entered setup mode. Additionally, or alternatively, electronic device 102 may provide audio and/or visual feedback to the customer 106(1) to indicate that the electronic device 102 has initiated the deregistration process.

Additionally, or alternatively, the electronic device 102 may automatically enter the setup mode without customer 106 input based in part on one or more deregistration indicators. For example, the deregistration module 112 may enter the setup mode based on the deregistration module 112 determining that the location of the electronic device 102 has changed. In some instances, the deregistration module 112 may collection location information associated with the electronic device 102 based on WiFi triangulation and/or IP geolocation. In some other instances, the deregistration module 112 may collection location information associated with the electronic device 102 based on a GPS device associated with the electronic device. Further, the deregistration module 112 may determine that the location information indicates a change in the location of the electronic device 102. As a result, the electronic device 102 may enter the setup mode. In some examples, the electronic device 102(1) may enter the setup mode based on the location information changing for a predetermined period of time. For instance, the deregistration module 112 may determine a first location associated with the electronic device 102(1). Further, the deregistration module 112 may determine that electronic device 102(1) has been moved to a second location different from the first location. In response, the deregistration module 112 may enter the setup mode. In some instances, the electronic device 102(1) may enter the setup mode based on the presence of the electronic device 102 at the second location for a period of time exceeding a predetermined period of time (e.g., one month).

In another example, the deregistration module 112 may perform the deregistration process based on activity information. For instance, the deregulation module 112 may perform the deregistration process based on the electronic device 102 determining that the electronic device 102 has been inactive for a predetermined period of time.

In some examples, the electronic device 102 may be embedded into a separate host device 224 (e.g., dishwasher, coffeemaker, refrigerator, etc). Further, the deregistration module 112 may perform the deregistration process based on device activity information associated with host device 224. For instance, the deregistration module 112 may perform a deregistration process based on the electronic device 102 detecting that the host device 224 has not been plugged into an electrical outlet for a period of time greater than a specified threshold. Additionally, the deregistration module 112 may perform the deregistration process based on location information associated with host device 224. In some instances, the electronic device 102 may perform the registration process based on detecting the removal of a fastening device associated with the host device 224. For example, the deregistration module 112 may determine that a screw affixing a dishwasher 224 to a wall has been removed. As a result, the deregistration module 112 may perform the deregistration process.

In some examples, the deregistration process may include performing a one-way function on the security token 116 to generate the deregistration token 120. For instance, the deregistration module 112 may generate the deregistration token 120 by performing a cryptographic function on the security token 116. Further, the deregistration module 112 may erase the security token 116 and other customer data 114 stored on the electronic device 102.

As illustrated in FIG. 2, the deregistration process may include the sending a deregistration request 226 to the fulfillment service 104. The deregistration request 226 may include the device identifier 110 and the deregistration token 120. In some other examples, the deregistration request 226 may include only the registration token 212. Upon receipt of the deregistration token 120, the device management service 126 may deregister the electronic device 102 within the fulfillment environment. For instance, the fulfillment service 104 may delete one or more order templates 132 associated with the electronic device 102 from the device registry 128. Further, the device management service 126 may update the customer account 134(1) associated with the customer 106(1) to indicate that the electronic device 102(1) is no longer registered to the customer 106(1). In addition, the device management service 126 may send a deregistration response to the electronic device 102 instructing the electronic device 102 to erase the deregistration token 120 from a storage component of the electronic device 102(1). Further, the electronic device 102 may provide audio and/or visual feedback to the customer 106(1) to indicate successful receipt of the deregistration response.

In some examples, the deregistration request 226 may not be successful. For instance, the electronic device 102 may not be capable of sending the deregistration request 226 to the fulfillment service 104 due to insufficient network access via the network 138. In some other instances, the device management service 126 may fail to delete the order templates 132 associated with the electronic device 102. As a result, the electronic device 102 may not receive the deregistration response 228 from device management service 126. Further, the electronic device 102 may include the deregistration token 120 in further communications with the fulfillment service 104 until the electronic device receives an instruction to delete the deregistration token 120 from a storage component of the electronic device 102(1).

For instance, suppose the customer 106(1) lends the electronic device to a friend 107. When the friend 107 attempts to register the electronic device 102 with the fulfillment service 106, the friend 107 may send a second registration request 230 via the electronic device 102. Further, the second registration request may include the device identifier 110, the deregistration token 120, and a second registration token 232 associated with the friend 107. Alternatively, the deregistration request 226 may only include the deregistration token 120 and the second registration token 232 associated with the friend 107.

Upon receipt of the second registration request 230, the device management service 126 of the fulfillment service 104 may determine that the second registration request 230 contains the deregistration token 120. For example, the device management service 126 may match the deregistration token 120 with a deregistration token stored locally in the deregistration token store 130. In response, the fulfillment service 104 may deregister the electronic device 102 within the fulfillment environment.

For instance, the fulfillment service 104 may delete one or more order templates 132 associated with the electronic device 102 from the device registry 128. Further, the device management service 126 may update the customer account 134(1) associated with the customer 106(1) to indicate that the electronic device 102(1) is no longer registered to the customer 106(1).

Further, device management service 126 may generate a new security token 234 for the friend 107. Further, the device management service may store one or more order templates 132 associated with the friend 107 in the device registry 128. The order templates 132 may include a mapping between the new security token 234 and a customer account 134(2) associated with the friend 107. In addition, the device management module 126 may generate a new deregistration token for the electronic device, and store the new deregistration token in the deregistration token store 130.

Further, the device management service 126 may send a second registration response 236 to the electronic device 102. The second registration response 236 may include the new security token 234. Further, the second registration response 236 may instruct the electronic device 102 to delete the deregistration token 120. In addition, the electronic device 102 may provide audio and/or visual feedback to the friend to indicate that the electronic device has received the second registration response.

Figure 3:
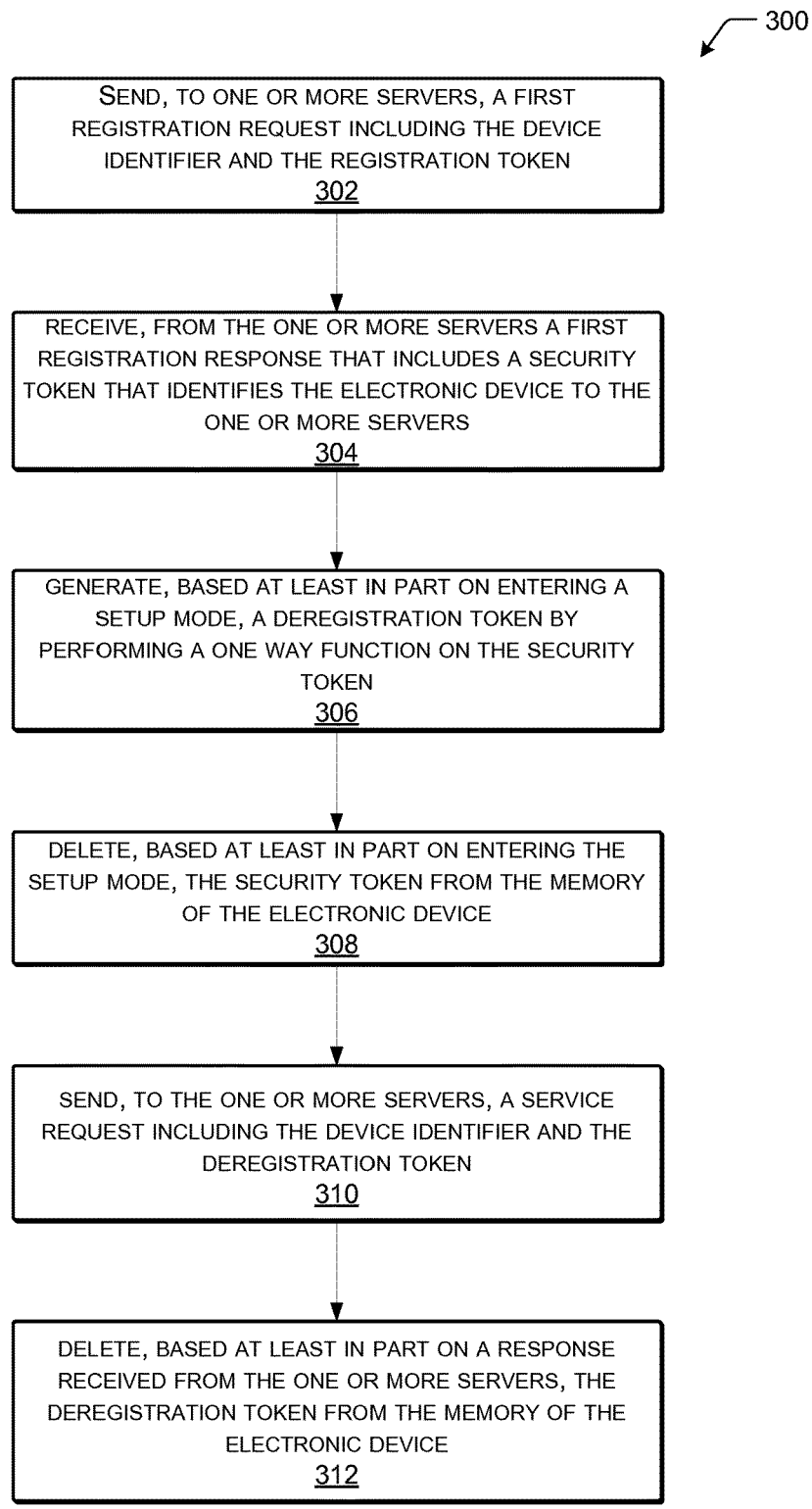
FIG. 3 is a flow diagram illustrating an example process for registering an electronic device with a fulfillment service according to some implementations.

FIG. 3 illustrates a process 300 for registration and deregistration within a fulfillment environment according to some implementations. The process 300 is illustrated as a collection of blocks in a logical flow graph, which represent a sequence of operations that can be implemented in hardware, software, or a combination thereof. The blocks are referenced by numbers 302-312. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 302, the electronic device may send, to one or more servers, a first registration request including the device identifier and the registration token. For example, a customer 106(1) may use the companion application 204 to acquire the registration token 212 from the fulfillment service 104 (not shown in FIG. 3). Further, the companion app 204 may send the registration token to the electronic device 102(1) (not shown in FIG. 3). As a result, the electronic device 102(1) may send a registration request 218 to the fulfillment service 104 including the registration token 212 and the device identifier 110 (not shown in FIG. 3).

At 304, the electronic device may receive, from the one or more servers a first registration response that includes a security token that identifies the electronic device to the one or more servers. For example, the electronic device 102 may receive a registration response 220 from the device management service 126 (not shown in FIG. 3). Further, the registration response 220 may include the security token 116 and the device identifier 110 of the electronic device 102. In some examples, the electronic device 102(1) may provide audio and/or visual feedback to the customer 106(1) to indicate successful receipt of the registration response 220.

At 306, the electronic device may generate, based at least in part on entering a setup mode, a deregistration token by performing a one way function on the security token. For example, the customer 106(1) may decide to sell or loan the electronic device 102 to another customer 106. Further, the customer 106(1) may press one or more of the controls 110 of the electronic device 102(1) for a specified period of time (e.g., 5 seconds). As a result, the electronic device 102(1) may enter the setup mode. Once the electronic device 102(1) enters the setup mode, the deregistration module 112 may determine that the electronic device 102(1) has been previously registered with the fulfillment service 104. For instance, the deregistration module 112 may determine that the customer data 114 contains the security token 116. Further, the deregistration module 112 may generate the deregistration token 120 by performing a cryptographic function on the security token 116.

At 308, the electronic device may delete, based at least in part on entering the setup mode, the security token from the memory of the electronic device. For example, the deregistration module 112 may delete the security token 116 and other customer data 114 stored on the electronic device 102.

At 310, the electronic device may send, to the one or more servers, a service request including the device identifier and the deregistration token. For example, the electronic device 102(1) may send the service request 136 to the fulfillment service 104. As shown in FIG. 1, the service request 136 may include the device identifier 110 and the deregistration token 120. In some other examples, the service request 136 may include a registration request.

At 312, the electronic device may delete, based at least in part on a response received from the one or more servers, the deregistration token from the memory of the electronic device. For example, the electronic device 102(1) may receive a deregistration response 228 from the device management service 126 instructing the electronic device 102 to delete the deregistration token 120 from a storage component of the electronic device 102(1). Further, the electronic device 102 may delete the deregistration token 120 from a memory component of the electronic device 102.

Figure 4:
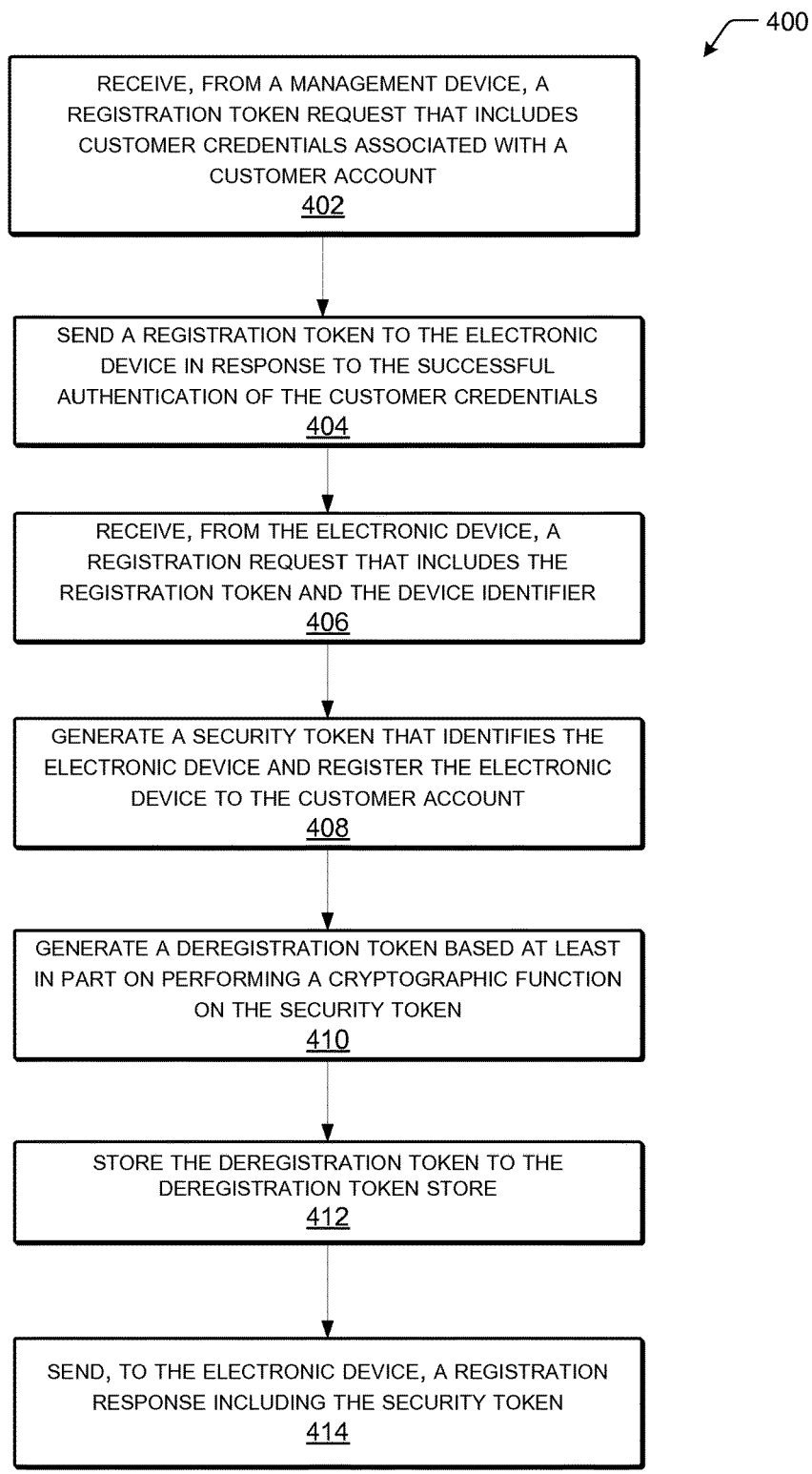
FIG. 4 is a flow diagram illustrating an example process for registering an electronic device with a fulfillment service according to some implementations.

FIG. 4 illustrates a process 400 for registering an electronic device with a fulfillment service within a fulfillment environment according to some implementations. The process 400 is illustrated as a collection of blocks in a logical flow graph, which represent a sequence of operations that can be implemented in hardware, software, or a combination thereof. The blocks are referenced by numbers 402-414. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 402, the fulfillment service may receive, from a management device, a registration token request that includes customer credentials associated with a customer. For example, the fulfillment service 104 may receive a registration token request 208 from the companion application 204. In some examples, the registration token request 208 may include credentials 210 associated with customer 106(1).

At 404, the fulfillment service may send a registration token to the electronic device in response to the successful authentication of the customer credentials. For example, if the device management service 126 successfully authenticates the customer credentials 210, the device service management 126 may send the registration token 212 to the companion application 204. In some examples, the registration token 212 may be a temporary token with a predetermined period of validity.

At 406, the fulfillment service may receive, from the electronic device, a registration request that includes the registration token and the device identifier. For example, fulfillment service 104 may receive, from the electronic device 102(1), a registration request 218 that includes the registration token 212 and the device identifier 110. In some examples, the fulfillment service may determine whether the registration token 212 is valid based upon a predetermined period of validity.

At 408, the fulfillment service may generate a security token that identifies the electronic device and register the electronic device to the customer account. For example, in response to determining that the registration token 212 is valid, the device management service 126 may generate the security token 126, which uniquely identifies the electronic device 102 within the fulfillment environment. In addition, the device management service 126 may store one or more order templates including the security token 116 and an identifier of the customer account 134. Further, the device management service 126 may update the customer account 134(1) associated with the customer 106(1) to indicate that the electronic device 102(1) is registered to the customer 106(1). For example, the device management service 126 may update a customer profile associated with the customer account to include an association between the electronic device 102 and the customer account 134.

At 410, the fulfillment service may generate a deregistration token based at least in part on performing a cryptographic function on the security token. For example, the device management service 126 may generate the deregistration token 120 associated with the electronic device 104 by performing a one-way function on the security token 120. In some embodiments, the device management service 126 may generate the deregistration token 120 in response to generating the security token.

At 412, the fulfillment service may store the deregistration token to the deregistration token store. For example, the device management service 126 may store the deregistration token 120 in the deregistration token store 130. In some instances, the deregistration token store 130 may include a mapping between the device identifier 110 and the deregistration token 120.

At 414, the fulfillment service may send, to the electronic device, a registration response including the security token. For example, the device management service 126 may send a registration response 220 to the electronic device 102(1). In some examples, the registration response 220 may include the security token 116 and the device identifier 110 of the electronic device 102(1). Alternatively, if the registration token is not valid, the registration response may not include the security token 116. Instead, the registration response 220 may indicate that the registration attempt is unsuccessful.

Although the subject matter has been described in language specific to structural features, it is to be understood that the subject matter defined in the appended claims is not necessarily limited to the specific features described. Rather, the specific features are disclosed as illustrative forms of implementing the claims.

Figure 5:
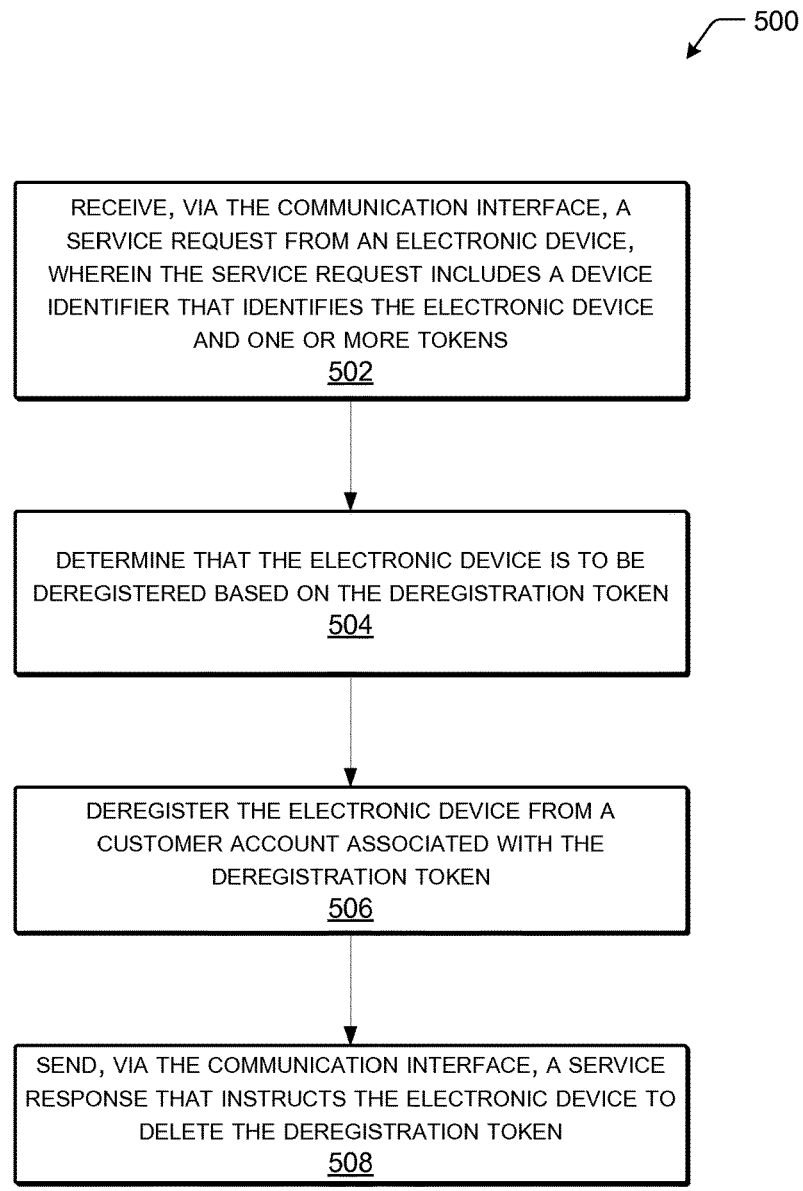
FIG. 5 is a flow diagram illustrating an example process for deregistering an electronic device with a fulfillment service according to some implementations.

FIG. 5 illustrates a process 500 for deregistering an electronic device with a fulfillment service within a fulfillment environment according to some implementations. The process 500 is illustrated as a collection of blocks in a logical flow graph, which represent a sequence of operations that can be implemented in hardware, software, or a combination thereof. The blocks are referenced by numbers 502-508. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 502, the fulfillment service may receive a service request from an electronic device, wherein the service request includes a device identifier that identifies the electronic device and one or more tokens. For example, the customer 106(1) may lend the electronic device to a friend 107 (not shown in FIG. 5). When the friend 107 attempts to register the electronic device 102 with the fulfillment service 104 (not shown in FIG. 5), the friend 107 may send a service request (e.g., the second registration request 230) via the electronic device 102 (not shown in FIG. 5). Further, the service request may include the device identifier 110 (not shown in FIG. 5), the deregistration token 120 (not shown in FIG. 5), and the second registration token 232 associated with the friend 107.

At 504, the fulfillment service may determine, based at least in part on the deregistration token store, that the one or more tokens include a deregistration token. For example, the device management service 126 may match the deregistration token 120 with a deregistration token stored locally in the deregistration token store 130 (not shown in FIG. 5). In some instances, the device management service 126 may use the device identifier 110 to locate the deregistration token stored locally in the deregistration token store 130.

At 506, the fulfillment service may deregister the electronic device from a customer account associated with the deregistration token. For example, the device management service 126 may delete one or more of order templates 132 associated with the electronic device 102 and the customer account 132. Further, the device management service 126 may update the customer account 134(1) associated with the customer 106(1) to indicate that the electronic device 102(1) is no longer registered to the customer 106(1). For example, the device management service 126 may remove an association between the electronic device 102 and the customer account 134 from a customer profile associated with the customer account 134.

At 508, the fulfillment service may send a service response that instructs the electronic device to delete the deregistration token. For example, the device management service 126 may send the deregistration response 228 to the electronic device 102 instructing the electronic device 102 to erase the deregistration token 120 from a storage component of the electronic device 102(1).

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 6:
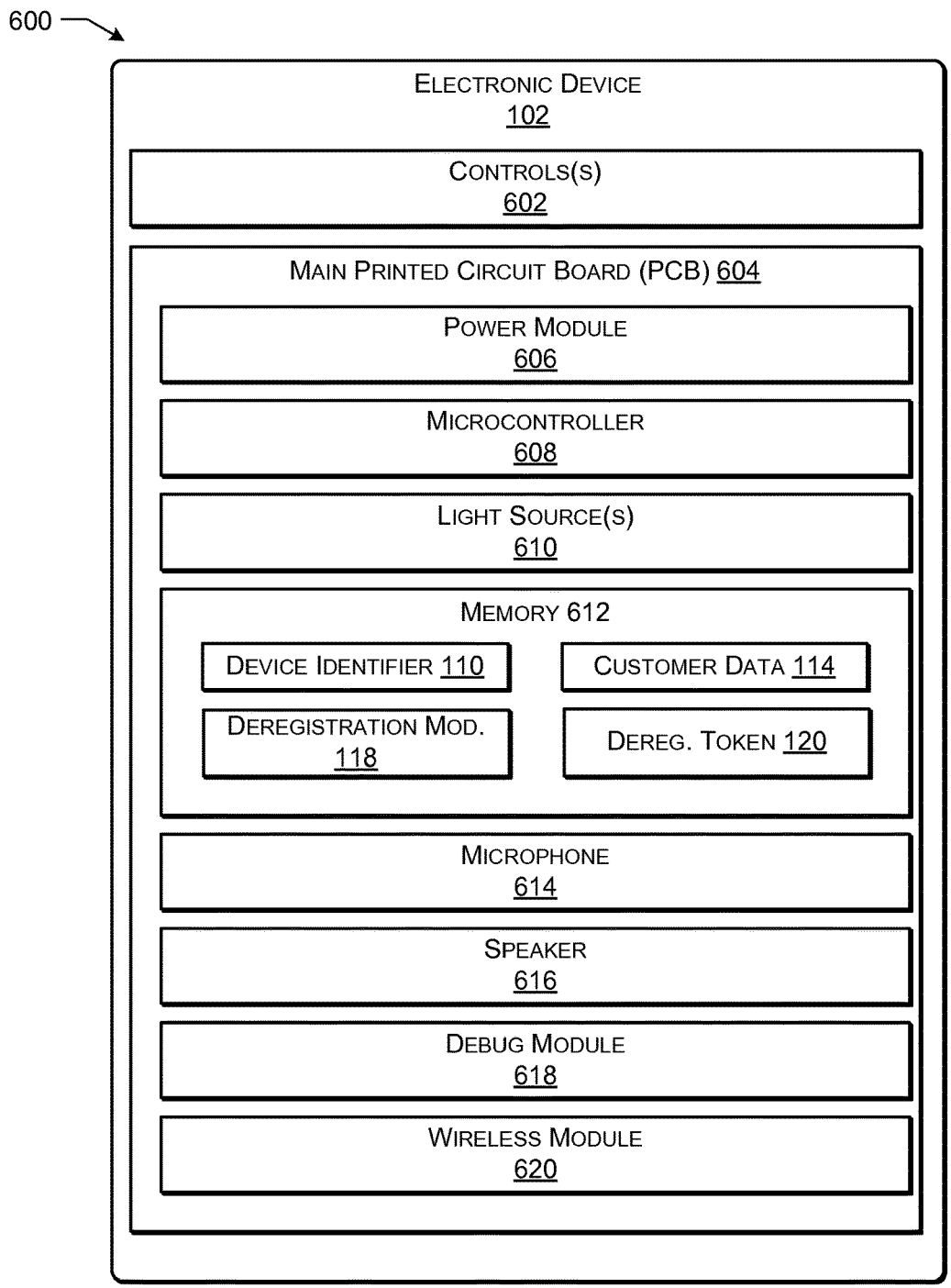
FIG. 6 illustrates select components of an example electronic device, according to some implementations.

FIG. 6 illustrates select electronic components of an electronic device, such as the electronic device 102, which are generally designated as 600. The device 600 includes one or more controls 602 and a main printed circuit board (PCB) 604. When a user selects a control 602 (e.g., a control selection), a signal is generated and a power module 606 powers up the main PCB 604. The power module 606 may be electrically connected to a microcontroller 608 on the main PCB 604. In a particular embodiment, the microcontroller 608 may include one or more processors with embedded memory (e.g., a 1 MB Flash memory) and static random-access memory (SRAM), such as a 122 KB static SRAM. In some other examples, the microcontroller 608 may include one or more microprocessors, and/or one or more application processors.

FIG. 6 further illustrates that the microcontroller 608 may be connected to one or more light sources 610, such as light emitting diodes (LEDs), that may be illuminated to provide visual feedback. FIG. 6 further illustrates that the microcontroller 608 may be communicatively coupled to a memory 612 (e.g., serial flash memory) that is used to store any number of data and/or applications depending upon implementation. As a basic implementation, the memory 612 stores at least the device identifier 110, the customer data 114, the deregistration module 118, and the deregistration token 120, and may further store, in a multiple control implementation, one or more control identifiers associated with one or more controls. In addition, the memory 612 may store various sound files, one or more audio files, programs to be executed by the microcontroller, and so on. In addition, a microphone 614 may be mounted on the PCB 604 and electrically coupled to the microcontroller 608. Further, a speaker 616 may be coupled to the microcontroller 608 to provide audio feedback or play audio files.

A programming/debug module 618 is provided to facilitate configuration and debugging of the device 600. The programming/debug module 618 may be implemented to receive instructions from the remote management device (e.g., device 202) to program the various controls for associated products and other order information.

A wireless module 620 (e.g., a Wi-Fi module) is also implemented by the device 600. The wireless module 620 may include hardware, such as an Institute of Electrical and Electronics Engineers (IEEE) 802.11b/g/n single band (e.g., 2.4 GHz) radio that may communicate via a single antenna. The wireless module 620 may be activated to establish a wireless connection (e.g., with the wireless access point (WAP) 216). In some cases, the microcontroller 608 may be configured to activate the wireless module 620 in order to establish a wireless connection with the WAP 216 based on the connection information 214 that may be stored in the memory 614. After establishing the wireless connection, information stored in the memory 614 (e.g., one or more audio files, one or more device identifiers, or combination thereof) may be communicated to a fulfillment service and/or management device 202 for processing.

Figure 7:
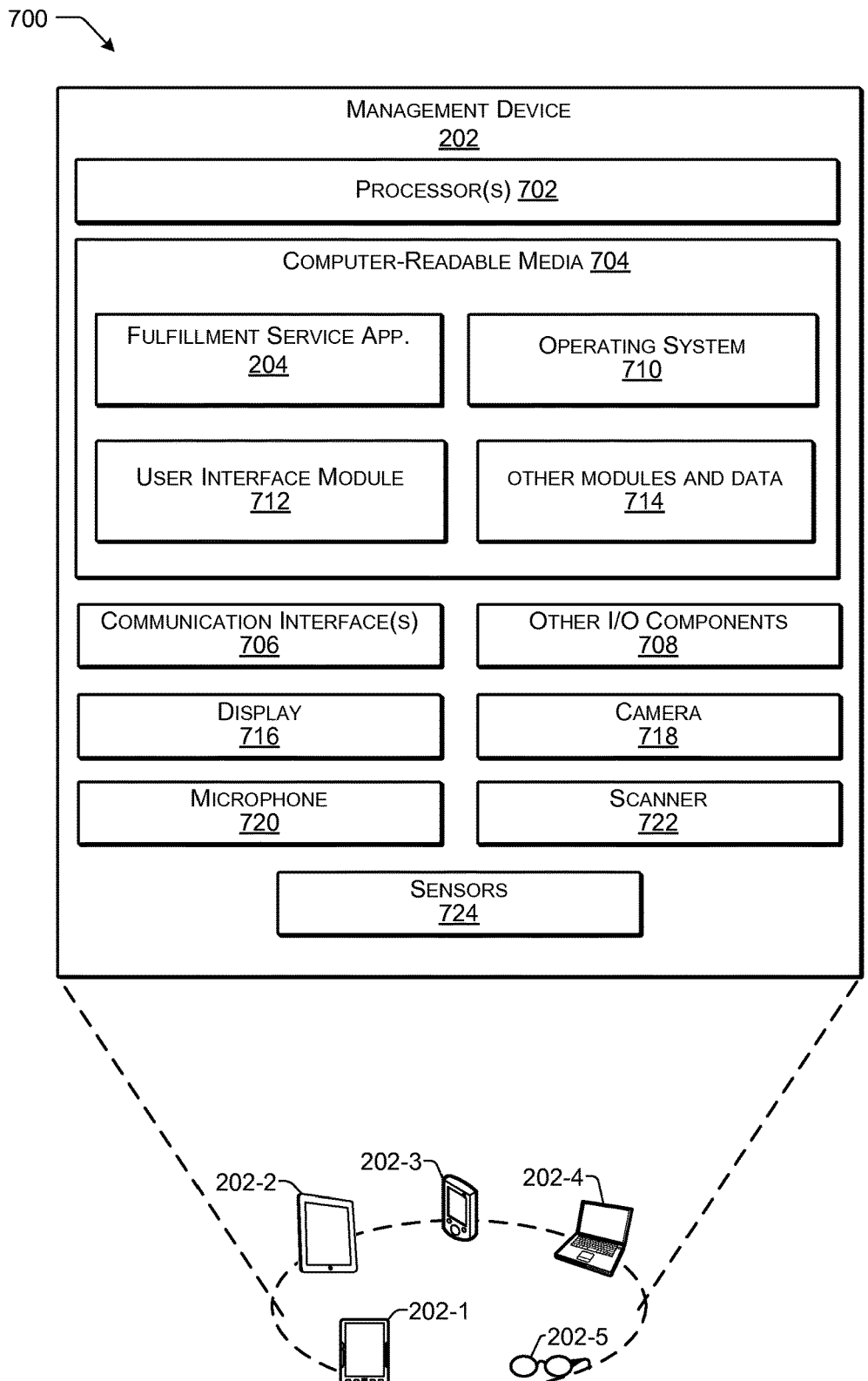
FIG. 7 illustrates select components of an example management device, according to some implementations.

FIG. 7 illustrates select example components of the management device 202 that may be used to implement the techniques and functions described herein according to some implementations. Some common examples of the management device 202 may include digital media devices and eBook readers 202-1; tablet computing devices 202-2; smart phones and mobile devices 202-4; laptop and netbook computing devices 202-5; and wearable electronic devices 202-5. For instance, the management device 202 may be a user-transportable device, a mobile device, or other portable device, such as a cellphone, a smart phone, a tablet computing device, an electronic book (eBook) reader device, a media player, a navigation device, a portable gaming device, a laptop computer, or other typically handheld devices that are easily passed between users. Additionally, in some examples herein, the management device 202 may be a wearable device or a device that is otherwise transported by a user, such as headphones, a helmet, augmented reality glasses, an article of clothing, a device retained in an armband or supported on a belt, a watch, a bracelet, an anklet, or any other portable or mobile electronic device having components capable of performing the recognition functions described herein, and that may be moved by, carried by, worn by, or supported by a person. Additionally, in some examples, herein, the electronic device may not be a handheld or user-transportable device, an instead may be a less mobile device such as a television, desktop computer, automotive electronic device, gaming console, appliance, tool and the like.

In the example of FIG. 7, the management device 202 includes components such as at least one processor 702, one or more computer-readable media 704, one or more communication interfaces 706, and one or more input/output (I/O) devices 708. Each processor 702 may itself comprise one or more processors or processing cores. For example, the processor 702 can be implemented as one or more microprocessors, microcomputers, microcontrollers, digital signal processors, central processing units, state machines, logic circuitries, and/or any devices that manipulate signals based on operational instructions. In some cases, the processor 702 may be one or more hardware processors and/or logic circuits of any suitable type specifically programmed or configured to execute the algorithms and processes described herein. The processor 702 can be configured to fetch and execute computer-readable processor-executable instructions stored in the computer-readable media 704.

Depending on the configuration of the management device 202, the computer-readable media 704 may be an example of tangible non-transitory computer-readable media and may include volatile and nonvolatile memory and/or removable and non-removable media implemented in any type of technology for storage of information, such as computer-readable instructions, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the management device 202 may access external storage, such as RAID storage systems, storage arrays, network attached storage, storage area networks, cloud storage, or any other medium that can be used to store information and that can be accessed by the processor 702 directly or through another computing device or network. Accordingly, the computer-readable media 704 may be computer storage media able to store instructions, modules or components that may be executed by the processor 702.

The computer-readable media 704 may be used to store and maintain any number of functional components that are executable by the processor 702. In some implementations, these functional components comprise instructions or programs that are executable by the processor 702 and that, when executed, implement operational logic for performing the actions attributed above to the management device 202. Functional components of the management device 202 stored in the computer-readable media 704 may include the fulfillment service companion application 206, which is executable by the processor 702 for managing an electronic device 102 associated with the fulfillment service 104. Other functional components may include an operating system 710 and a user interface module 712 for controlling and managing various functions of the management device 202 and providing basic functionality. In some examples, the operating system 710 may manage and control at least a portion of the registration operations described herein. In addition, the computer-readable media 704 may also store data, data structures and the like, that are used by the functional components. Depending on the type of the management device 202, the computer-readable media 704 may also optionally include other functional components and data, such as other modules and data 714, which may include applications, programs, drivers, etc., and the data used or generated by the functional components. Further, the management device 202 may include many other logical, programmatic and physical components, of which those described are merely examples that are related to the discussion herein.

The communication interface(s) 706 may include one or more interfaces and hardware components for enabling communication with various other devices, such as over the network(s) 138 or directly. For example, communication interface(s) 706 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 7 further illustrates that the management device 202 may include a display 716. Depending on the type of computing device used as the management device 202, the display may employ any suitable display technology. For example, the display 716 may be a liquid crystal display, a plasma display, a light emitting diode display, an OLED (organic light-emitting diode) display, an electronic paper display, or any other suitable type of display able to present digital content thereon. In some examples, the display 716 may have a touch sensor associated with the display 716 to provide a touchscreen display configured to receive touch inputs for enabling interaction with a graphic interface presented on the display 716. Accordingly, implementations herein are not limited to any particular display technology. Alternatively, in some examples, the management device 202 may not include a display.

The management device 202 may further include a camera 718, a microphone 720, a scanner 722, as well as various types of other sensors 724, which may include a GPS device, a gyroscope, an accelerometer, and so forth. In addition, the management device 202 may include various other types of other input/output (I/O) components 706 such as various user controls (e.g., buttons, a joystick, a keyboard, a keypad, etc.), one or more speakers, a haptic or tactile output device, connection ports, and so forth. For example, the operating system 710 of the management device 202 may include suitable drivers configured to accept input from a keypad, keyboard, or other user controls and devices included as the I/O components 708. For instance, the user controls may include page turning controls, navigational keys, a power on/off control, selection keys, and so on.

Additionally, the management device 202 may include a power source, such as a battery and power control unit for providing power to management device 202. Furthermore, the management device 202 may include various other components that are not shown, examples of which include removable storage, a PC card component, and so forth, depending on the configuration and purpose of the management device 202.

Figure 8:
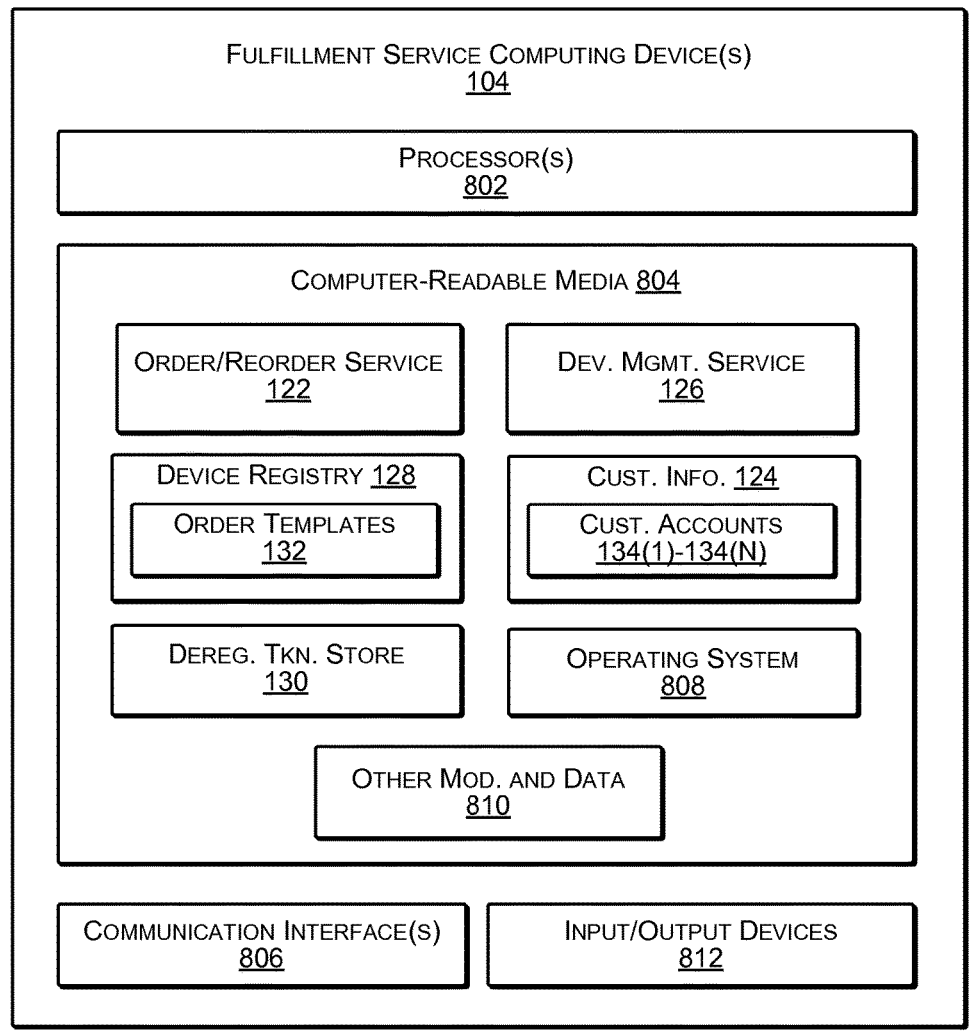
FIG. 8 illustrates select components of an example fulfillment service device, according to some implementations.

FIG. 8 illustrates select components of the fulfillment service computing device 104 that may be used to implement some functionality of the device management service 126 described herein. The fulfillment service 104 may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the fulfillment service 104 as being present in a single location, these components and data may alternatively be distributed across different computing devices and different locations in any manner. Consequently, the functions may be implemented by one or more service computing devices, with the various functionality described herein distributed in various ways across the different computing devices. Multiple fulfillment service computing devices 104 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, each service computing device 104 may include one or more processors 802, one or more computer-readable media 804, and one or more communication interfaces 806. Each processor 802 may be a single processing unit or a number of processing units, and may include single or multiple computing units or processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. Such computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the fulfillment service 104, the computer-readable media 804 may be any type of computer-readable storage media and/or may be any tangible non-transitory media to the extent that non-transitory computer-readable media exclude media such as energy, carrier signals, electromagnetic waves, and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed herein to the fulfillment service 104. In addition, the computer-readable media 804 may store data used for performing the operations described herein. In the illustrated example, the computer-readable media 804 may store the customer information 124, the device registry 128, and the deregistration token store 130.

In the illustrated example, the functional components stored in the computer-readable media 804 may include the order/reorder service 122 and the device management service 126. Additional functional components stored in the computer-readable media 804 may include an operating system 808 for controlling and managing various functions of the fulfillment service 104. The fulfillment service 104 may also include or maintain other functional components and data, such as other modules and data 810, which may include programs, drivers, etc., and the data used or generated by the functional components. Further, the fulfillment service 104 may include many other logical, programmatic and physical components, of which those described above are merely examples that are related to the discussion herein.

The communication interface(s) 806 may include one or more interfaces and hardware components for enabling communication with various other devices, such as the electronic device(s) 102, management device(s) 202 or other computing devices, over the network(s) 138. For example, communication interface(s) 806 may facilitate communication through one or more of the Internet, cable networks, cellular networks, wireless networks (e.g., Wi-Fi, cellular) and wired networks. As several examples, the fulfillment service 104 and the electronic device 102 may communicate and interact with one another using any combination of suitable communication and networking protocols, such as Internet protocol (IP), transmission control protocol (TCP), hypertext transfer protocol (HTTP), cellular or radio communication protocols, and so forth.

The fulfillment service 104 may further be equipped with various input/output (I/O) devices 812. Such I/O devices 812 may include a display, various user interface controls (e.g., buttons, joystick, keyboard, mouse, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

What is claimed is:

1. A system comprising:
    one or more servers that communicate with an electronic device, the electronic device having a device identifier and a first registration token associated with a first customer account, the one or more servers comprising:
    a device registry including an order template associating the electronic device to a product;
    a deregistration token store that includes a plurality of deregistration tokens; and
    customer information that includes a first customer profile associated with the first customer account and a second customer profile associated with a second customer account;
    the one or more servers are programmed to:
    receive, from the electronic device, a first registration request to register the electronic device with the first customer account, wherein the first registration request includes the device identifier and the first registration token;
    register the electronic device with the first customer account by updating the first customer profile to include an association between the electronic device and the first customer account;
    send, to the electronic device, a first registration response that includes a security token that identifies the electronic device to the one or more servers;
    receive, from the electronic device, a second registration request to register the electronic device with the second customer account, wherein the second registration request includes the device identifier, a first deregistration token and a second registration token associated with the second customer account;
    determine that the electronic device is to be deregistered from the first customer account based at least in part on the first deregistration token matching a second deregistration token stored in the deregistration token store;
    delete, from the device registry, the order template associated with the electronic device;
    remove, from the first customer profile, the association between the electronic device and the first customer account;
    register the electronic device with the second customer account by updating the second customer profile to include an association between the electronic device and the second customer account; and
    send, to the electronic device, a second registration response that includes a second security token that identifies the electronic device to the one or more servers.

2. The system as recited in claim 1, wherein the one or more servers are further programmed to generate the second deregistration token by performing a hash function on the security token to form a keyed-hash message authentication code.

3. The system as recited in claim 1, further comprising:
    a management device having a customer credential for authenticating a customer associated with the first customer account to the one or more servers and wireless network information for connecting to a wireless device, and wherein the management device is programmed to:
    send, to the one or more servers, a registration token request including the customer credential;
    receive the first registration token from the one or more servers in response to the one or more servers authenticating the customer credential; and
    send the first registration token and the wireless network information to the electronic device.

4. A method comprising:
    sending, by an electronic device configured to order an item from a fulfillment service, a registration request to register the electronic device with a customer account associated with a customer of the electronic device;
    receiving, by the electronic device, a registration response that includes a security token that identifies the electronic device to the fulfillment service;
    sending, by the electronic device, a deregistration request to deregister the electronic device with respect to the customer account;
    generating, by the electronic device and based at least in part on the deregistration request, a deregistration token based at least in part on performing a cryptographic function on the security token;
    deleting, from the electronic device, customer data associated with the customer, wherein the customer data includes the security token and wireless connection information for establishing a wireless connection with a wireless device associated with the customer; and
    sending, to the fulfillment service, a deregistration request including the deregistration token, the deregistration request causing the electronic device to be deregistered with respect to the customer account.

5. The method of claim 4, further comprising:
detecting activation of a control of the electronic device for a period of time greater than a predetermined threshold, wherein activation of the control includes at least one of pressing a button of the electronic device or a user touch associated with a touch sensitive display of the electronic device; and
entering, by the electronic device, a setup mode for deregistering the electronic device with the fulfillment service.

6. The method of claim 4, further comprising:
detecting that the electronic device has not been used for a period of time exceeding a predetermined threshold; and
entering, by the electronic device, a setup mode for deregistering the electronic device with the fulfillment service.

7. The method of claim 4, further comprising:
detecting a change in a location of the electronic device based at least in part on wireless information associated with the electronic device; and
entering, by the electronic device, a setup mode for deregistering the electronic device with the fulfillment service.

8. The method of claim 4, wherein the security token represents a first security token, and further comprising:
receiving a registration token from a companion application on a management device associated with the electronic device, wherein the registration request further includes the registration token;
receiving, from the fulfillment service, a second security token; and
deleting the deregistration token from the electronic device.

9. The method of claim 4, further comprising:
sending, to the fulfillment service, a registration token request including a customer credential associated with the customer account; and
receiving, from the fulfillment service, a registration token associated with the first customer account.

10. The method of claim 9, wherein the registration request includes the registration token.

11. The method of claim 4, further comprising:
receiving, from the fulfillment service, an encrypted device identifier that identifies the electronic device to the fulfillment service; and
wherein the registration request further includes the encrypted device identifier.

12. The method of claim 4, wherein the electronic device is included in a home appliance.

13. A fulfillment service device comprising:
one or more processors;
a device registry;
a deregistration token store;
a communication interface;
one or more computer-readable media; and
processor-executable instructions maintained on the one or more computer- readable media which, when executed by the one or more processors, program the one or more processors to:
receive, via the communication interface, a registration request to register an electronic device with a customer account associated with a customer of the electronic device;
send, via the communication interface, a registration response that includes a security token that identifies the electronic device to the fulfillment service device:
register the electronic device with the customer account;
receive, via the communication interface, a deregistration request from the electronic device, wherein the deregistration request includes a device identifier that identifies the electronic device and a deregistration token;
determine that the electronic device is to be deregistered based at least in part on the deregistration token;
delete, from the device registry, an order template associated with the electronic device and an association between the electronic device and the customer account, the association indicating that the customer is authorized to order items via the electronic device; and
send, via the communication interface, a deregistration response that instructs the electronic device to delete the deregistration token.

14. The fulfillment service device as recited in claim 13, further comprising:
a customer profile associated with the customer account, wherein the customer profile includes information associating the electronic device with the customer account;
and wherein the processor-executable instructions further program the one or more processors to remove, from the customer profile, the information associating the electronic device with the customer profile.

15. The fulfillment service device as recited in claim 13, wherein the deregistration token represents a first deregistration token, and determining that electronic device is to be deregistered further includes matching the first deregistration token with a second deregistration token included in the deregistration token store.

16. The fulfillment service device as recited in claim 13, wherein the processor-executable instructions further program the one or more processors to:
receive, from a management device, a registration token request that includes a customer credential associated with the customer account;
authenticate the customer based at least in part on the customer credential; and
send, to the electronic device, a registration token associated with the customer account.

17. The fulfillment service device as recited in claim 13, wherein the customer account represents a first customer account, and the registration request includes a registration request comprising a registration token associated with a second customer account.

18. The fulfillment service device as recited in claim 17, wherein the processor-executable instructions further program the one or more processors to:
remove, from a first customer profile, the association between the electronic device and the first customer account; and
register the electronic device with the second customer account by updating a second customer profile associated with the second customer to include a second association between the electronic device and the second customer account.

19. The fulfillment service device as recited in claim 13, wherein the processor-executable instructions further program the one or more processors to:
- receive, from the electronic device, a registration request to register the electronic device with the customer account, wherein the registration request includes the registration token and the device identifier;
- generate a security token that identifies the electronic device to the fulfillment service device;
- generate the deregistration token based at least in part on performing a cryptographic hash function on the security token;
- store the deregistration token to the deregistration token store; and
- send, to the electronic device, the registration response including the security token.

20. The fulfillment service device as recited in claim 19, wherein the processor-executable instructions further program the one or more processors to add, to a customer profile associated with the customer account, the association between the customer account and the electronic device.

\* \* \* \* \*